United States Patent
O'Boyle et al.

[11] Patent Number: 5,905,210
[45] Date of Patent: May 18, 1999

[54] VILLARI EFFECT SEAT WEIGHT SENSOR

[75] Inventors: Michael E. O'Boyle, Brighton; Dennis E. Palmer; Edward J. Gillis, both of South Lyon, all of Mich.

[73] Assignee: Automotive Systems Laboratory, Inc., Farmington Hills, Mich.

[21] Appl. No.: 09/004,548

[22] Filed: Jan. 8, 1998

Related U.S. Application Data

[60] Provisional application No. 60/035,149, Jan. 9, 1997.

[51] Int. Cl.[6] ........................................ G01L 1/12
[52] U.S. Cl. ........................................ 73/862.331
[58] Field of Search ..................... 73/862.69, 779; 340/870.36

[56] References Cited

U.S. PATENT DOCUMENTS

| | | | |
|---|---|---|---|
| 4,802,368 | 2/1989 | Nordvall | 73/862.69 |
| 4,823,621 | 4/1989 | Sobel et al. | 73/862.69 |
| 5,007,295 | 4/1991 | Gustafsson et al. | 73/862.69 |
| 5,437,197 | 8/1995 | Uras et al. | 73/862.69 |
| 5,580,804 | 12/1996 | Gioutsos | 280/735 |
| 5,739,757 | 4/1998 | Gioutsos | 340/667 |
| 5,747,696 | 5/1998 | Kwun et al. | 73/728 |

OTHER PUBLICATIONS

PCT International Search Report, Mailed Jun. 19, 1998, regarding International Application No. PCT/US98/00656.
Back in Style: Magnetostrictive Sensors, Magnetostrictive Sensors Technology, Hegeon Kwun Ph.D., Mar. 1995, 8 pages.
Signal Detection Methods for Magnetostrictive Sensors, SAE International, Mehmet H. Uras, Feb. 24, 1997, 13 pages.

*Primary Examiner*—Ronald Biegel
*Attorney, Agent, or Firm*—Lyon, P.C.

[57] ABSTRACT

A Villari effect sensor comprises a sensing rod constructed from a magnetostrictive material. An alternating current signal applied to an overlapping drive coil is inductively coupled by the sensing rod to the sensing coils and generates a signal thereon, responsive to the permeability of the magnetostrictive sensing rod which decreases responsive to the applied load. The sensing rod comprises one or more sections, each having a distinct cross-sectional area, and a sensing coil is associated with each section. A signal processor calculates the magnitude of the applied force from either the maximum flux density, or by differencing the first and third harmonics of the signal from the sensing coil. The weight of an occupant on a vehicle seat is measured by either incorporating a tensile force measuring Villari effect sensor in series with the seat springs, or incorporating a compressive force measuring Villari effect sensor in series with seat posts.

30 Claims, 6 Drawing Sheets

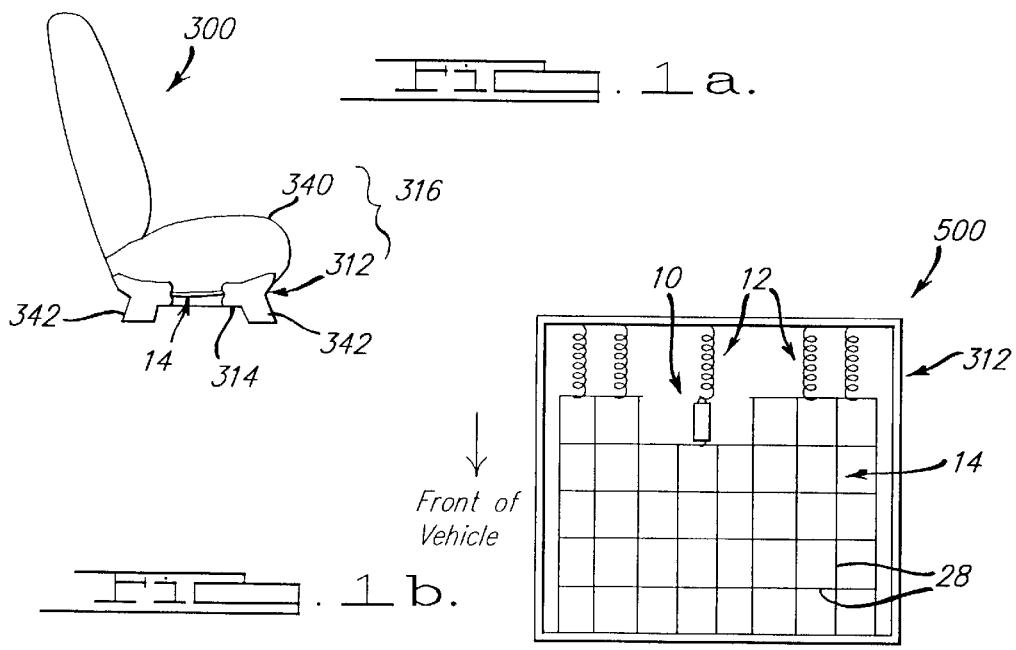
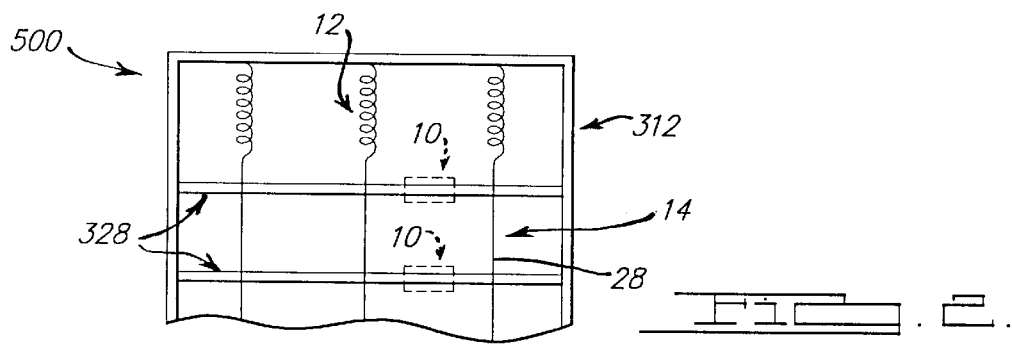
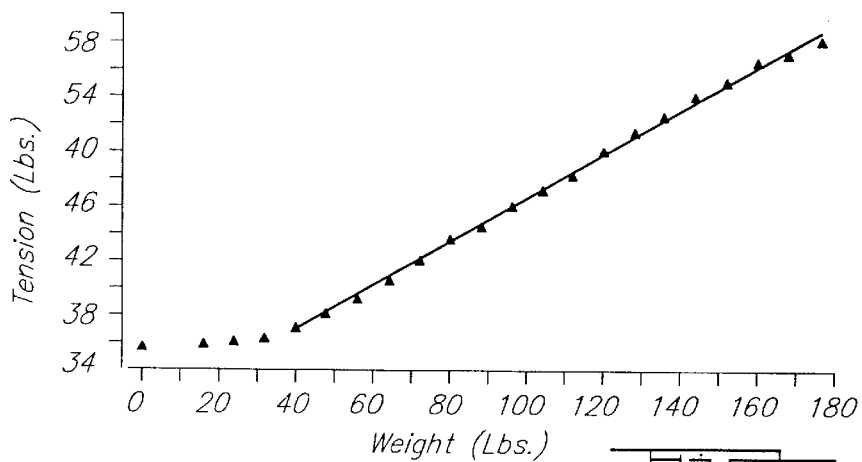

VILLARI EFFECT SEAT WEIGHT SENSOR

CROSS-REFERENCE TO RELATED APPLICATIONS

The instant application claims the benefit of prior U.S. Provisional Application Ser. No. 60/035,149 filed Jan. 9, 1997.

TECHNICAL ART

The instant invention generally relates to sensors and systems for measuring weight and more particularly to a weight sensor for measuring the weight of occupants and other objects in a motor vehicle seat such as useful determining occupant seating conditions for controlling a vehcile safety restraint system.

BACKGROUND OF THE INVENTION

A vehicle may contain automatic safety restraint actuators that are activated responsive to a vehicle crash for purposes of mitigating occupant injury. Examples of such restraint actuators include air bags, seat belt pretensioners, and deployable knee bolsters.

One objective of an automatic safety restraint system is to mitigate occupant injury, thereby not causing more injury with the automatic restraint system than would be caused by the crash had the automatic restraint system not been activated. Notwithstanding the protective benefit of these automatic safety restraint actuators, there is generally both a risk and a cost associated with the deployment thereof. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Potential dangers of air bags have recently received increased attention from the media and from government organizations. A number of deaths of infants and small children have occurred as the result of rapidly inflating passenger-side air bags. It is often desirable to disable the passenger-side air bag when the passenger seat is occupied by an infant seat or small child. If the weight of the seat occupant can be measured, then it is possible to disable the passenger-side airbag when the seat is occupied by an infant or small child. If the occupant weight can be measured then the airbag inflation profile can also be tailored to more closely match the size of the passenger. For example a much less aggressive airbag inflation profile is required to protect a 90 pound female than is required for a 250 pound male.

Air bag inflators are designed with a given restraint capacity, as for example, the capacity to protect an unbelted normally seated fiftieth percentile occupant when subjected to a 30 MPH barrier equivalent crash, which results in associated energy and power levels with can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants at a greater risk for injury when exposed to higher severity crashes.

Another technique for mitigating injury to occupants by the air bag inflator is to control the of inflation rate or the capacity of the inflator responsive to a measure of the severity of the crash. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the air bag inflator responsive to the presence, position, and size of the occupant, or to the severity of the crash. For example, the air bag inflator can be disabled if the occupant weight is below a given threshold. Moreover, the inflation capacity can be adjusted by controlling the number of inflation stages of a multi-stage inflator that are activated. Furthermore, the inflation power can be adjusted by controlling the time delay between the firings of respective stages of a multi-stage inflator.

One measure of restraint capacity of an air bag inflator is the amount of occupant kinetic energy that can be absorbed by the associated air bag system, whereby when the occupant collides with the gas filled air bag, the kinetic energy of the occupant is converted to potential energy via the pressurization of the air bag, and this potential energy is dissipated by venting pressurized gases from the air bag. As a vehicle in a crash is decelerated, the velocity of an unrestrained occupant relative to the vehicle increases. Preferably, the occupant restraint process is commenced early in the crash event so as to limit the amount of occupant kinetic energy that must be absorbed and thereby minimize the associated restraint forces and accelerations of and loads within the occupant. If the occupant were a simple inertial mass without friction relative to the vehicle, the kinetic energy of the occupant would be given by $\frac{1}{2} M \cdot V^2$, where M is the mass of the occupant and V is the occupant velocity relative to the vehicle. If a real occupant were represented by an interconnected set of bodies, some of which have friction relative to the vehicle, each body of which may have differing velocities relative the vehicle, the above equation would apply to the motion of the center of gravity of the occupant. Regardless of the representation, occupants of larger mass will have a larger kinetic energy for the same velocity relative to the vehicle. Therefore, an occupant weight sensor is useful in an air bag system with variable restraint capacity to enable the restraint capacity to be preferentially adapted to the weight, or mass, of the occupant.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. Occupant presence can be detected by a seat weight sensor adapted to provide either a continuous measure of occupant weight or to provide a binary indication if the occupant weight is either above or below a specified weight threshold.

Known seat weight sensors comprise one or more pads employing force sensitive resistive (FSR) films. These arrangements are typically used as weight threshold systems to disable a passenger air bag when the seat is empty. Load cells attached to the seat mounting posts have also been used in research applications. Mechanisms that use string based potentiometers to measure downward seat displacement have also been investigated.

Such known arrangements suffer from several drawbacks. First, variable resistance force sensors have limited sensitivity and in some situations are not sensitive enough to put directly under a seat pad while still achieving the desired response. Second, the threshold weight system provides only very limited information. For example, such arrangements provide no indication as to the size of an occupant. Third, the resistance values of known variable force resistor change with temperature, and are subject to drift over time with a constant load on the sensor. Fourth, known arrangements comprise a plurality of resistors that are connected in parallel so that the overall signal can be dominated by a relatively light load which is concentrated upon any one of the resistors, thereby causing a measurement which erroneously indicates a larger weight than actually present on the seat. Fifth, these arrangements do not provide any information regarding the distribution of the weight on the seat.

Furthermore, other known sensing arrangements do not otherwise provide suitable results. For example, the use of load cells is prohibitively expensive for large-scale commercial applications. Further, mounting of load cells underneath the seat posts so as to measure the weight of the entire seat has not proven feasible because weight applied to load cells must be within 5° of vertical in order to prevent damage to the load cell, therefore requiring the vehicle floor pan to be relatively flat. However, many automobile floor pans are not flat and the seat mounting bolts are oriented at angles other than vertical. Even if the bolts were mounted vertically, they would require a controlled torque level so as not to bias the sensing devices. Also, the shape of the vehicle's floor pan can change over time leading to additional stresses on the load cells and false readings. Finally, strain gauges of any type may be impractical because of the difficulty in applying them to the strained material. Finally, mechanical string potentiometer based weight sensors are complex, and subject to failure from stretching of the string.

Methods which attempt to estimate weight by measuring downward movement of the spring bed within the seat suffer from a serious limitation whereby seat geometry changes over the lifetime of the seat. More specifically, seats tend to take a "set" over time so that the springs and cushion tend to move downward as the seat ages. A displacement-based system would require periodic recalibration over the lifetime of the seat.

The prior art also teaches the use of seat weight sensors outside the automotive environment, for example as a means for disabling the activation of either a boat or an industrial machine if the operator is not properly seated, or for weighing a person seated on an exercise bike. These devices employ pneumatic bladders located in the seat, whereby the pressure within the bladder is used to either activate a threshold switch or to provide a continuous indication of occupant weight.

One problem with prior art pneumatic sensors, particularly when applied to the automotive environment, is their sensitivity to environmental conditions, particularly to ambient temperature and pressure. This requires the bladder to be partially filled with fluid under ambient conditions of lower temperature or higher pressure, thereby making the bladder more sensitive to bottoming out when exposed to localized or concentrated loads and therefor requiring a means for distributing the loads over the load bearing area of the bladder Pneumatic seat weight sensors can be sensitive to the amount of air initially in the associated bladder. A seat weight sensor in an automotive environment must function reliably and accurately over a wide range of temperatures and pressures which can cause significant errors.

Another problem with a pneumatic seat weight sensor is that the overall height of the inflated sensor bladder must be sufficiently great to prevent the top and bottom surfaces of the bladder from compressing against one another responsive to a sufficiently great localized or concentrated load under conditions when the bladder has a relatively small amount of gas, such as would occur when the bladder is filled at low pressure or high temperature.

Yet another problem with a pneumatic seat weight sensor is that a gas filled bladder is also prone to loss of fluid by leakage or osmosis, which necessitates a means for automatically replenishing the working fluid of the bladder over the life of operation.

The prior art also teaches the use of hydraulic load cells, wherein the weight to be measured acts upon a piston element of known area, whereby the measured weight is found by multiplying a measured pressure times the known area. One problem with hydraulic load cells in the automotive environment, particularly in a seat, is that the effects of load cell orientation on hydraulic head can introduce load measurement errors.

SUMMARY OF THE INVENTION

In accordance with the instant invention, a Villari effect/magnetostrictive seat weight sensor is provided which generates an accurate measurement of the weight of the occupant on an automobile seat. The instant invention is particularly suited for use with systems which control deployment of an air bag or other passenger safety restraint in an automobile, such as for allowing disablement or adjustment of the inflation profile of an air bag. Disablement is particularly desirable when a seat is empty, occupied by an infant seat or person of small physical size, or when an adult occupant is leaning forward in the seat. The output of the instant invention can be utilized to determine the presence of an occupant, and/or used to estimate occupant position in the seat.

In further accordance with the instant invention, a Villari effect seat weight sensor is designed to provide an accurate measurement of the weight of the occupant of an automobile seat, and which can be utilized as a stand-alone sensor or in conjunction with occupant position sensing systems which control the operation of air bag inflators in automobiles. The air bag can be disabled in the presence of infant seats and small children or the inflation profile can be adjusted to match the size of the seat occupant.

The seat weight sensor of the instant invention does not require significant mechanical movement in order to provide an estimate of occupant weight and, as such, is not plagued with the reliability problems inherent in most mechanical systems. The Villari effect is largely independent of temperature, so the sensor will provide an accurate measurement of weight over a wide temperature range. Further, the sensor of the instant invention is also inexpensive and capable of being subjected to very high compressive or tensile loads without causing damage as could occur if a load cell were used.

Accordingly, one object of the instant invention is to provide an improved seat weight sensor that provides a consistent and accurate measure of the seat loading independent of the location of the source of weight on the seat.

A further object of the instant invention is to provide an improved seat weight sensor that provides a consistent and accurate measure of the seat loading independent of the size and distribution of the source of weight on the seat.

A yet further object of the instant invention is to provide an improved seat weight sensor that provides a consistent and accurate measure of the seat loading independent of the amount of weight on the seat.

A yet further object of the instant invention is to provide an improved seat weight sensor that operates under a wide range of ambient temperature and pressure conditions.

A yet further object of the instant invention is to provide an improved seat weight sensor that can distinguish between a rear facing infant seat, for which an air bag system is preferably not deployed, and other occupants for which an air bag system is preferably deployed in the event of a crash of sufficient severity.

A yet further object of the instant invention is to provide an improved seat weight sensor that can be incorporated into an intelligent safety restraint system for which the preferable mode of the activation of a controllable occupant restraint system is dependent upon the weight of the occupant.

A yet further object of the instant invention is to provide an improved seat weight sensor that does not interfere with occupant comfort.

A yet further object of the instant invention is to provide an improved seat weight sensor that is insensitive to the orientation of the seat.

A yet further object of the instant invention is to provide an improved seat weight sensor that is inexpensive to produce.

In accordance with these objectives, one feature of the instant invention is a Villari effect sensor comprising a sensing rod made of magnetostrictive material, a drive coil and associated circuit for creating an alternating magnetic field within the sensing rod, one or more sensing coils for sensing the magnetic field therein, an associated plurality of signal integrators for integrating the signals generated by the sensing coils and thereby generating integrated signals, and a signal processor for calculating the force acting upon the sensing rod from the plurality of signals.

Another feature of the instant invention is a Villari effect sensor which incorporates a plurality of sections, each having a distinct cross-sectional areas, and which incorporates an associated plurality of sensing coils, each of which senses the magnetic field within the associated section.

Yet another feature of the instant invention is the measurement of force acting upon the Villari effect sensor from the corresponding peak magnetic flux density within the sensing rod.

Yet another feature of the instant invention is the measurement of force acting upon the Villari effect sensor from the harmonic content of the associated signals.

Yet another feature of the instant invention is the incorporation of a material in the sensing rod for which the permeability thereof decreases responsive to the applied force.

Yet another feature of the instant invention is the incorporation of a nickel material in the sensing rod for sensing tensile forces by the Villari effect sensor.

Yet another feature of the instant invention is the incorporation of a material selected from the group of Permalloy, 46-Permalloy, vanadium permendur, Terfenol, or Terfenol-D in the sensing rod for sensing compressive forces by the Villari effect sensor.

Yet another feature of the instant invention is the incorporation of one or more tensile force sensing Villari effect sensors in series with one or more associated seat springs for sensing the weight of an occupant in a vehicle seat.

Yet another feature of the instant invention is the incorporation of one or more tensile force sensing Villari effect sensors within the seat support structure for sensing the weight of an occupant in a vehicle seat.

Yet another feature of the instant invention is the incorporation of a plurality of compressive force sensing Villari effect sensor in series with the seat support posts for sensing the weight of an occupant in a vehicle seat.

The specific features of the instant invention provide a number of associated advantages. One advantage of the instant invention with respect to the prior art is that the plurality of distinct sections in the sensing rod provide for increase dynamic sensing range.

Another advantage of the instant invention is that the Villari effect sensor insensitive to variations in ambient temperature or pressure.

Yet another advantage of the instant invention is that the Villari effect sensor has no moving parts and is therefore inherently reliable.

Yet another advantage of the instant invention is that the output from the Villari effect sensor is relatively linear and accurate.

Yet another advantage of the instant invention is that the measurement sensitivity of the Villari effect sensor is improved by the utilization of signal harmonics to measure the force acting upon the sensing rod.

Yet another advantage of the instant invention is that the Villari effect sensor can be readily incorporated into an existing seat structure for measuring the weight of occupants thereon.

Yet another advantage of the instant invention is that the seat weight sensor thereof is sufficiently robust, reliable and accurate to enable associated occupant weight dependent control of a controllable occupant restraint system.

Yet another advantage of the instant invention is that the seat weight sensor thereof is relatively inexpensive to produce.

Accordingly, the instant invention provides an improved seat weight sensor that is insensitive to the effects of ambient temperature and pressure; which is simple in construction and relatively robust and reliable in operation; which can be readily incorporated into an automotive seat without interfering with occupant comfort; and which can be produced relatively inexpensively.

These and other objects, features and advantages of the instant invention will be more fully understood after reading the following detailed description of the preferred embodiment with reference to the accompanying drawings. While this description will illustrate the application of the instant invention in an automotive safety restraint system, it will be understood by one with ordinary skill in the art that the instant invention can also be applied to other systems for weighing objects.

BRIEF DESCRIPTION OF THE DRAWINGS

FIG. 1a is side view of a typical automotive seat illustrating one arrangement of the instant invention therein.

FIG. 1b is a top view of a typical automotive seat in accordance with FIG. 1a.

FIG. 2 is a partial top view of a typical automotive seat illustrating an alternate arrangement of the instant invention therein FIG. 3 is a graph showing seat spring force as a function of occupant weight for the arrangement of FIG. 1a.

DETAILED DESCRIPTION OF THE PREFERRED EMBODIMENT(S)

Figure 4A:
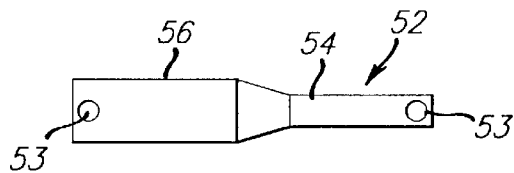
FIG. 4a illustrates a sensing rod element in accordance with the instant invention.

The seat weight sensor of the present operates by utilizing the principle that magnetic permeability of certain materials will vary under the application of stress applied to the material. This principal is known as the Villari effect.

More specifically, the Villari or "inverse Joule magnetoelastic" effect was discovered and studied by Joule and Villari in the mid 1800's. The Villari effect phenomenon occurs in ferromagnetic materials and is characterized by a change in the magnetic permeability of the material when subjected to stress. That is, the ability to magnetize the material depends upon the level of stress applied to the material. The Villari effect is closely related to the magnetostriction phenomenon. Magnetostriction (often called "Joule magnetostriction") characterizes the expansion or contraction of a ferromagnetic material under magnetization. Positive magnetostrictive materials expand parallel to the direction of the magnetic field when magnetized, whereas negative magnetostrictive materials contract in the direction parallel the magnetizing field when magnetized.

Materials which exhibit magnetostrictive properties will also exhibit the Villari effect. Materials with a positive magnetostriction coefficient suffer a decrease in magnetic permeability when subjected to compressive stresses, and will exhibit an increase in permeability when subjected to tensile stresses. The reverse occurs in negative magnetostrictive materials, i.e., permeability increases when compressive stresses are applied and decreases upon the application of tensile stress. This change in permeability or response magnetization of the material when stress is applied is referred to as the Villari effect.

Examples of positive magnetostrictive materials include iron, vanadium permendur (49% iron, 49% cobalt, 2% vanadium), or the permalloy (Nickel-iron) series of alloys. Terfenol-D is a ceramic material consisting of iron, terbium, and dysprosium specifically formulated to have an extremely high positive magnetostriction. Nickel is an example of a material with a negative magnetostriction coefficient. If a metallic alloy is used, the material must be properly annealed in order to remove work hardening effects and to ensure reasonable uniformity of the sensing material.

The sensor of the instant invention is arranged to measure either compressive or tensile forces, and as described more fully hereinbelow, is applicable to either a tension or compression measuring Villari effect sensor. Initially, an appropriate magnetostrictive material must be selected depending on whether tensile or compressive forces are being measured. If tensile forces are to be measured, then the material should have a negative magnetostrictive coefficient so as to exhibit a decrease in permeability in the presence of a tensile force. Similarly, if compressive forces are to be measured, then a positive magnetostrictive material should be selected so that a decrease in permeability results under compression. The sign of the magnetostriction coefficient is chosen so that the sensor operates in a region of decreasing magnetic permeability. In general a sensor which utilizes a decreasing permeability with increased force will have a much greater dynamic range and will provide a signal which varies more linearly with applied force than one which utilizes increasing permeability as force is applied.

FIGS. 1a, 1b and 2 illustrate application of the instant invention to a spring-bed style seat by integration of at least one Villari effect/magnetostrictive measuring device therein. In a first embodiment shown in FIG. 1b, a Villari effect sensor 10 is placed in-line with the supporting seat springs 12 in order to measure the tensile force exerted on the spring bed wires 28. More specifically, a seat cushion 340 supporting "flex mat" 14 resides in the seat base 316. The "flex mat" 14 consists of a series of flexible spring bed wires 28 attached to the seat frame 312 on at least one side by a series of supporting seat springs 12. The Villari effect sensor 10 is placed in series with one of the supporting seat springs 12. The force from any weight placed upon the seat 300 will be transferred from the seat cushion down to the "flex mat" 14. Weight on the "flex mat" 14 increases the tension in each of the supporting seat springs 12 and in the Villari effect sensor 10 itself.

An alternative arrangement is shown in FIG. 2 that provides for integrating the sensor of the instant invention with a laterally extending flexible metal bar(s) 328 incorporated into the seat support structure 314.

FIG. 3 illustrates how tension in the supporting seat springs 12 varies linearly with occupant weights above about 30 lbs. This data was collected from an automobile seat with a calibrated tension sensor in place of the Villari effect sensor 10 shown in FIG. 1b.

Figure 4B:
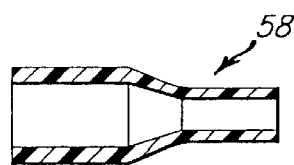
FIG. 4b illustrates a bobbin element in accordance with the instant invention.
Figure 4C:
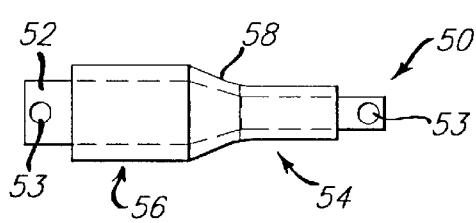
FIG. 4c illustrates a sub-assembly of the sensing rod element of FIG. 4a in the bobbin element of FIG. 4b, in accordance with the instant invention.

FIGS. 4a–c, 5, 6a–d, and 7 illustrate the overall construction of Villari effect sensor 10. As seen in FIGS. 4a–c, Villari effect sensor 10 is formed from a sensing rod 52 and a bobbin 58 designed to hold the sensing rod 52. The sensing rod 52 is provided with two distinct sections 54 and 56, each having a distinct cross sectional area (diameter) so a fixed compressive or tensile force will produce two distinct pressure levels within each sensor region of the sensor. The change in permeability caused by the Villari effect is a function of the pressure applied to the material. The Villari effect sensor 10 makes use of two distinct cross sectional areas in order to provide increased measurement accuracy and greater dynamic range. The smaller diameter section 54 provides sensitivity for relatively small force levels. At larger force levels the Villari effect within the smaller diameter section 54 will have reached saturation levels. Within the larger diameter section 56, however, the pressure level will be lower and still well within the range where pressure can be measured by making use of the Viliari effect. If the Villari effect sensor 10 is to the used to measure tensile forces, then attachment holes 53 are provided at each end for use as attachment points.

FIG. 4b illustrates the bobbin 58 which houses the sensing rod 52, and FIG. 4c illustrates the sensing rod/bobbin subassembly 50. The bobbin 58 is typically made of a nonmetallic material which will not affect the magnetic fields which are present. Teflon® and Delrin® are materials which are well suited for this purpose. Care must also be taken to ensure that the bobbin 58 and encapsulation 86 materials can withstand the heat levels generated by the sensor.

Figure 5:
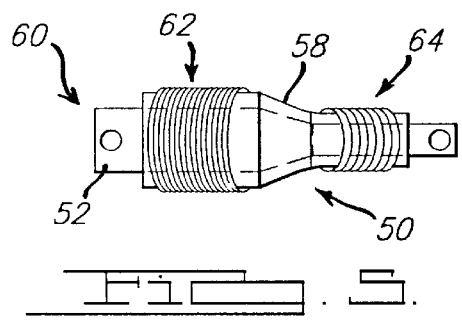
FIG. 5 illustrates a sub-assembly of first and second sensing coil elements with the sub-assembly of FIG. 4c, in accordance with the instant invention.
Figure 6A:
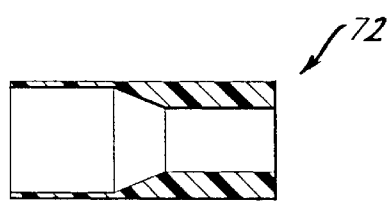
FIG. 6a illustrates a bobbin housing element in accordance with the instant invention.
Figure 6B:
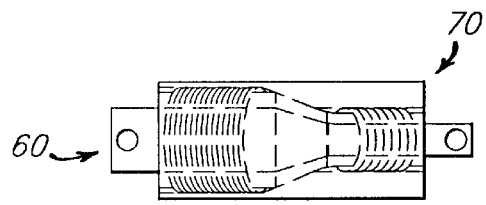
FIG. 6b illustrates a sub-assembly of the bobbin housing element of FIG. 6a with the sub-assembly of FIG. 5, in accordance with the instant invention.
Figure 6C:
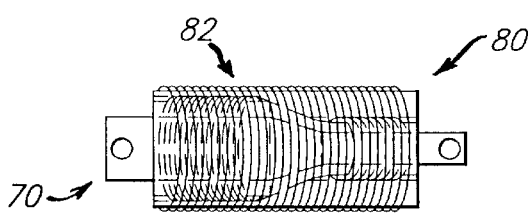
FIG. 6c illustrates a sub-assembly of a drive coil element with the sub-assembly of FIG. b, in accordance with the instant invention.
Figure 6D:
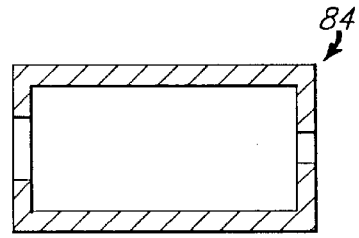
FIG. 6d illustrates a sensor housing element in accordance with the instant invention.

As seen in FIG. 5, a plurality of flux measurement or sense coils 62 and 64 are wrapped around the bobbin at each of the respective two distinct sections 54 and 56 of the sensing rod 52 so as to form a sense coil subassembly 60. The sense coils 62 and 64 measure the rate of change of the magnetic flux in each of the two distinct sections 54 and 56 of the sensing rod 52.

The bobbin 58 and sense coils 62 and 64 are then placed inside a bobbin housing 72 as illustrated in FIGS. 6a–d so as to form a bobbin housing subassembly 70. The bobbin housing 72 protects the sense coils 62 and 64 and provides a uniform diameter for a drive coil 82 that is wrapped around and over the exterior surface of the bobbin housing 72 so as to form a drive coil subassembly 80. The drive coil 82 creates an alternating magnetic field used to magnetize the sensing rod 52, as described more fully hereinbelow.

In further accordance with the instant invention, the placement of the sense coils 62 and 64 within the drive coil 82 improves overall performance of the Villari effect sensor 10. More specifically, because the strength of the H field applied by the drive coil 82 falls off very quickly beyond the ends of the solenoid, the placement of the shorter sense coils 62 and 64 within the drive coil 82 insures that a uniform field is applied throughout the length of each sense coil 62 and 64.

Figure 7:
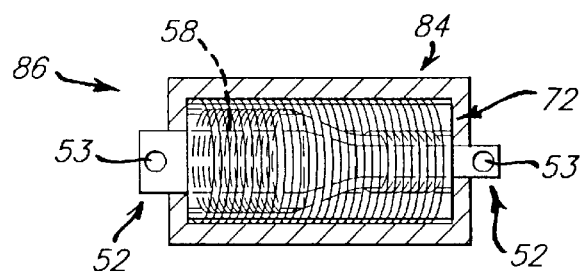
FIG. 7 illustrates the sensor assembly in accordance with the instant invention comprising an assembly of the sensor housing element of FIG. 6d with the sub-assembly of FIG. 6c.

Finally, as shown in FIG. 7, the assembly of the Villari effect sensor 10 is completed by placing the drive coil subassembly 80 inside a sensor housing 84, the material of which may be ferrous in order to provide a good magnetic shielding for the Villari effect sensor 10.

In operation, when an occupant sits on the seat, the tensile force on Villari effect sensor 10 increases via the supporting seat spring 12 or the flexible metal bar 328 which force is subsequently measured by the Villari effect sensor 10 as described more fully hereinbelow.

Figure 8:
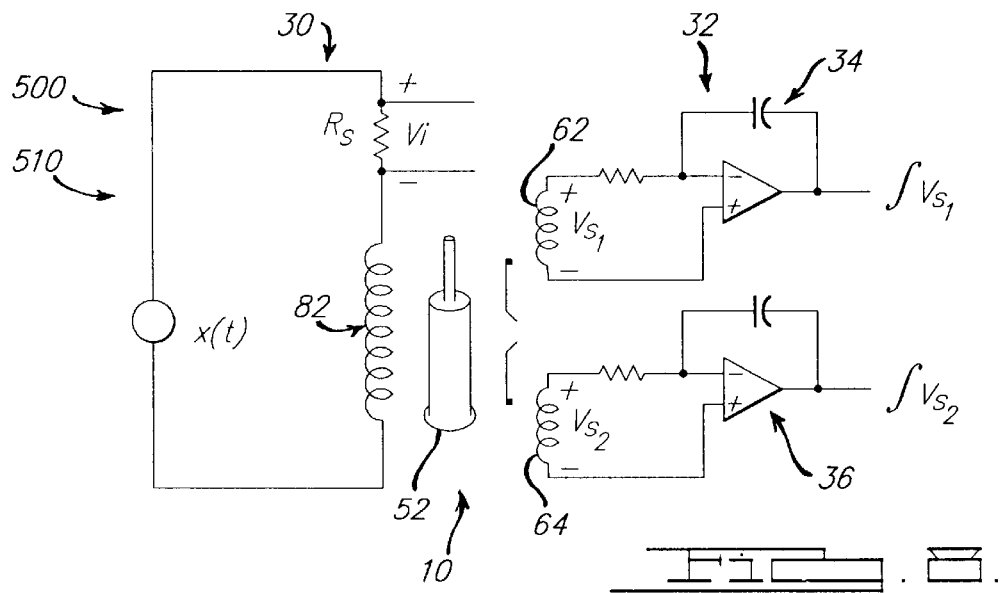
FIG. 8 is a schematic diagram of a sensor system in accordance with the instant invention.

FIG. 8 illustrates a schematic of the sensing system 510 in accordance with the instant invention. An alternating-current drive signal, X(t), provides a current source for the drive coil 82. The drive coil 82 magnetizes the sensing rod 52. A drive current sensing resistor, $R_s$, creates a drive current signal, $V_i$, that is proportional to the instantaneous current in the drive coil 82. The current in the drive coil 82 is proportional to the H field applied to the sensing rod 52. The sense coils 62 and 64 generate corresponding output signals, $V_{S1}$, and $V_{S2}$, each being a voltage proportional to the derivative of the magnetic flux within the associated section of the sensing rod 52. Sense coil output signals $V_{S1}$, and $V_{S2}$ are then each separately integrated so as to create integrated signals $V_{S1}$ and $V_{S2}$ proportional to the flux (and consequently the magnetic induction) within the associate sections of the sensing rod 52.

Figure 9:
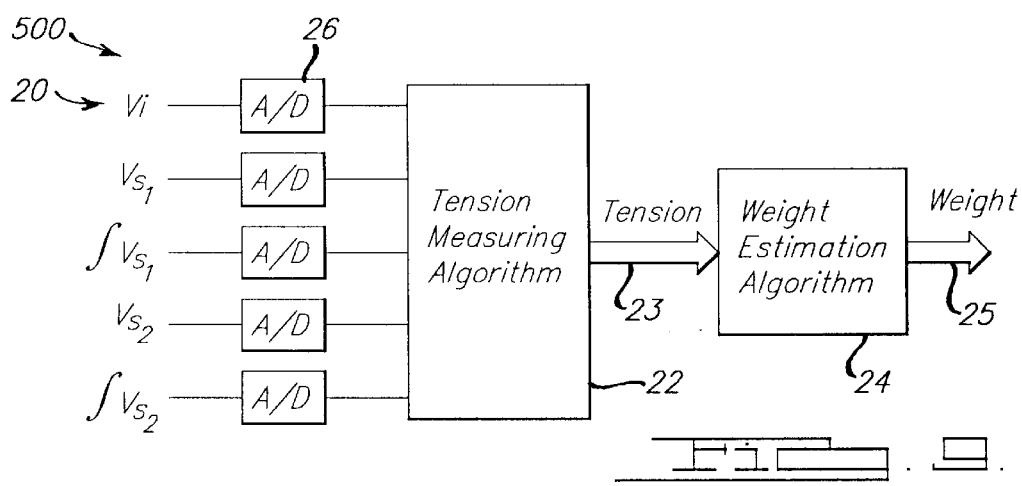
FIG. 9 is a block diagram of a signal processor in accordance with the instant invention.

As shown in FIG. 9, some or all of the five above described signals are then sampled and converted with A/D converters 26 of a signal processor 20 which utilizes a suitable tension measuring algorithm 22 to accurate estimate the force applied to the sensing rod 52. The tension measuring algorithm 22 contains calibration parameters describing the characteristics of the individual sensing rod 52 used in that Villari effect sensor 10. For example, calibration parameters such as coercive force, remnant magnetization, and permeability (slope) at various points in the B-H loop curve can be determined for the sensing rod at various force levels. The algorithm then compares the current measured values of these parameters to the corresponding stored values and forms an estimate of tension. Note that the tension measuring algorithm 22 is preferably calibrated to match the individual sensing rod 52 which is used in the Villari effect sensor 10. Once the tension measuring algorithm 22 is calibrated, the calibration is specific to the configuration of the associated sensing rod 52 used so that sensing rods 52 cannot be interchanged between Villari effect sensors 10. In general the calibration parameters for each Villari effect sensor 10 are distinct for a given design.

Experimental tests have been conducted in order to determine the best magnetization parameters to use for estimating applied force. Discriminants tested included residual flux density, maximum flux density, coercive force, residual differential permeability, peak differential permeability, as well as discriminants formed from the ratios of the signal harmonics from the sense coil output signals $V_{S1}$ and $V_{S2}$. Ratios of the signal harmonics of sense coil output signals $V_{S1}$ and $V_{S2}$ as well as the integrated values of these signals were tested as discriminants for force estimation. Experiments showed that maximum flux density or a discriminant formed from the difference-in-amplitude between the third and first harmonic of the sense coil output signals $V_{S1}$, and $V_{S2}$ (or their integrated values) provides the best discriminant for measuring applied force. These discriminants change in a linear and monotonic fashion as force is applied to the sensing rod 52.

Figure 10:
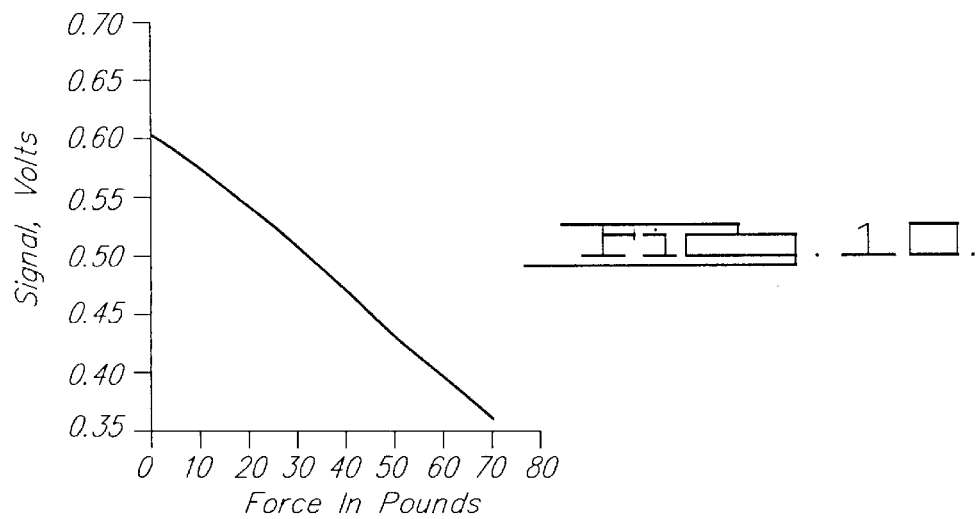
FIG. 10 illustrates an operative characteristic of the instant invention.

FIG. 10 shows the change in a signal proportional to the maximum flux density as a function of force for tensile force applied to a nickel sensing rod 52. This signal was obtained by integrating the sense coil output signal, $V_{S1}$ or $V_{S2}$.

Figure 11:
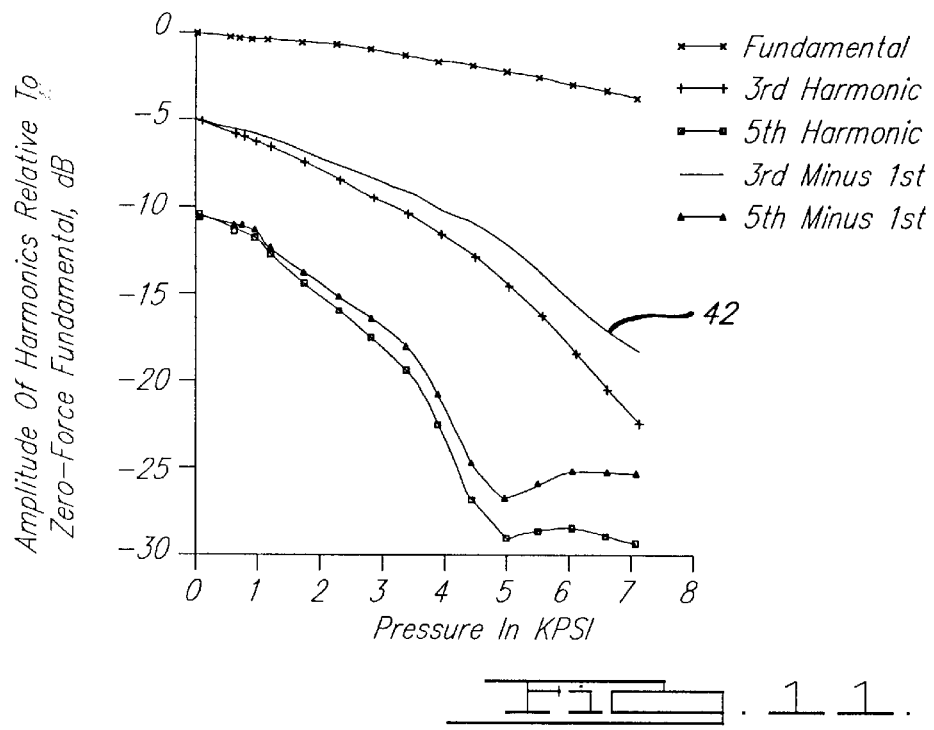
FIG. 11 illustrates another operative characteristic of the instant invention.

FIG. 11 shows the change in the discriminant 42 verses tensile pressure obtained by taking the difference in decibel amplitudes between the third and first harmonics of sense coil output signal $V_{S1}$, for a nickel rod.

Figure 12:
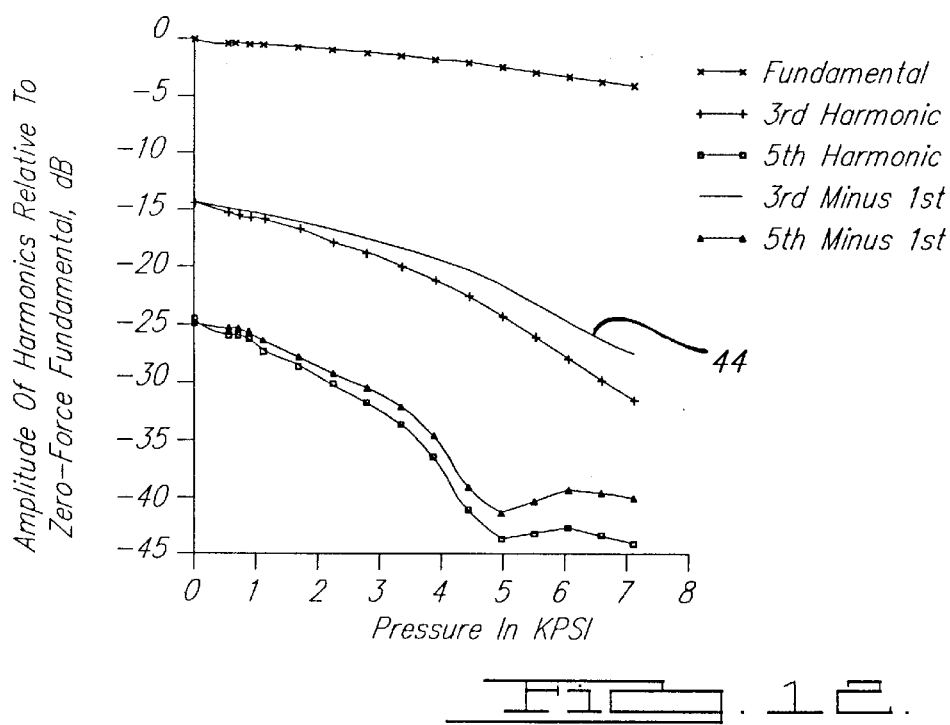
FIG. 12 illustrates yet another operative characteristic of the instant invention.

FIG. 12 shows the change in the discriminant 44 verses tensile pressure obtained by taking the difference in amplitudes between the third and first harmonics of the integrated signals $V_{S1}$, for a nickel rod.

A number of materials were tested in order to assess their suitability as sensing materials, and the relative sensitivities of these materials are tabulated in Table 1. Each of the materials shown has a positive magnetostriction coefficient (permeability decreases under compressive force) except for nickel which has a negative magnetostriction coefficient (permeability decreases under tension). Nickel is suitable for use in a sensor where a tensile force is applied to the sensing material, whereas any of the other materials could be used in a sensor in which a compressive force is applied to the sensing material. Table 1 shows that Terfenol-D offers the greatest sensitivity among positive magnetostrictive materials, while iron is the least sensitive of the materials with positive magnetostriction coefficients.

TABLE 1

| Material | Percentage change in maximum flux density 0 to 6 Kpsi |
|---|---|
| Terfenol | 92.9% |
| Nickel | 24.2% |
| Iron | 5.0% |
| Vanadium permendur | 7.3% |
| 46-permalloy | 12.0% |

The signal processor 20 also has a suitable weight estimation algorithm 24 that utilizes the tension measurement 23 to generate a weight estimate 25 of the occupant, wherein the tension measurement 23 and weight estimate 25 are preferably related by a linear equation found from a curve fit of experimental data. The weight estimation algorithm 24 contains calibration data specific to the type of seat 300 used and the location of the Villari effect sensor 10 within the seat 300. The weight estimation algorithm 24 is identical for all Villari effect sensors 20 used in the same location in the same type of seat 300.

Figure 13:
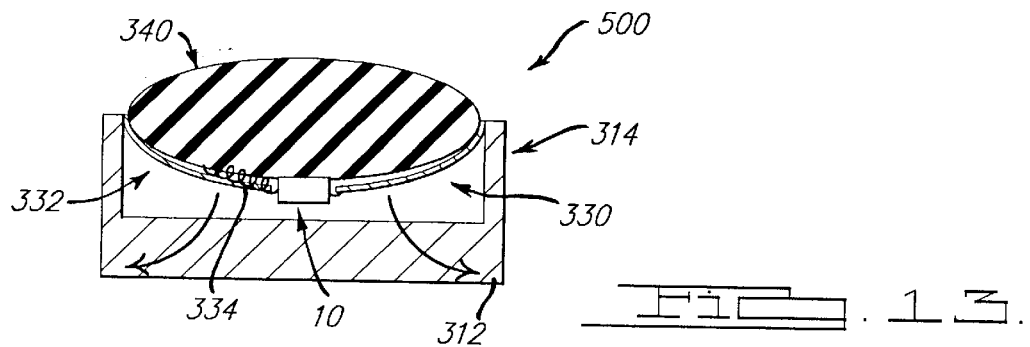
FIG. 13 is a front view of an automotive seat having a seat pan, illustrating the incorporation of the instant invention therein.
Figure 14:
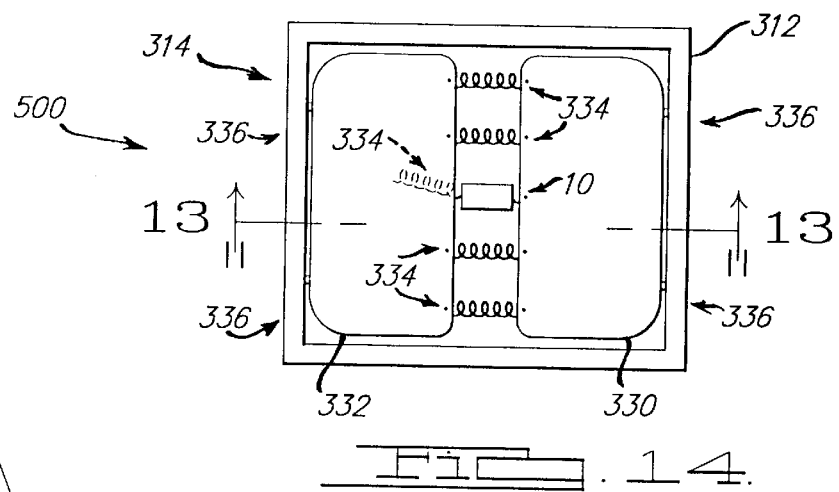
FIG. 14 is a top view of the automotive seat of FIG. 13 having a seat pan, illustrating the incorporation of the instant invention therein.

In further accordance with the instant invention, a Villari effect sensor 10 can also be incorporated into a pan-style seat 300 such as shown FIGS. 13 and 14, wherein a foam seat cushion 340 rests in a metal or plastic seat pan which is segmented into two halves 330 and 332. Each seat pan half 330 and 332 attached to the seat frame 312 at hinge points 336. The two seat pan halves 330 and 332 are joined by a series of seat pan springs 334 as well as by a Villari effect sensor 10, preferably in series with one of the seat pan springs 334. Weight placed on the seat cushion 340 exerts forces that tend to cause the two seat pan halves 330 and 332 to swing outward as shown by the curved arrows in FIG. 13, thereby increasing the tension in the Villari effect sensor 10.

While incorporation of a Villari effect sensor 10 into the seat support structure as described above is preferred, the measurement of seat weight in such a system is dependent upon deformation of the seat support structure 314. This dependency upon deformation creates uncertainty in the weight estimate that must be accounted for by the weight estimation algorithm 24.

Figure 15:
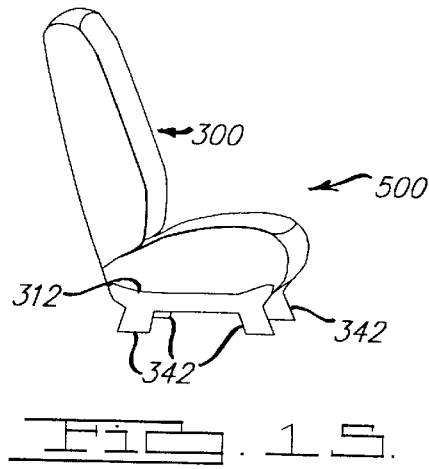
FIG. 15 illustrates an automotive seat with seat posts that incorporate the instant invention.
Figure 16:
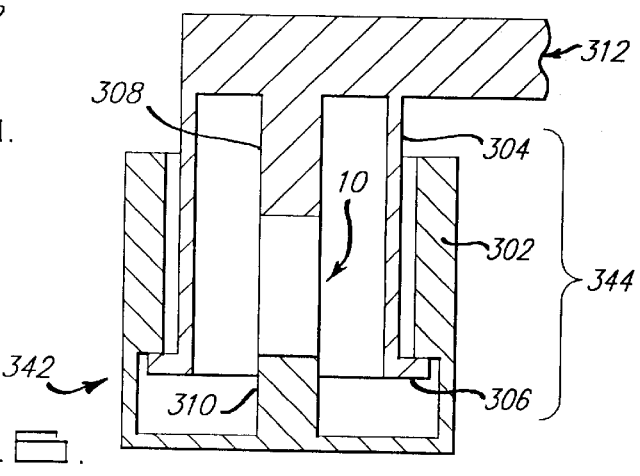
FIG. 16 illustrates a cross section of an automotive seat post incorporating the instant invention.

Referring to FIGS. 15 and 16, a more accurate seat weight measurement system can be constructed by incorporating Villari effect sensors 10 into each of the four seat posts 342, so as to directly measure the reaction forces that support the seat 300. This arrangement is entirely independent of occupant seating position. As seen in FIG. 16, the seat posts 342 are cylindrical in shape and incorporate a sleeve assembly 344 which keeps the seat 300 position fixed within the vehicle. The outer sleeve 302 is mounted to the floor pan and serves to keep the inner sleeve 304 in place during severe breaking or a crash. The inner sleeve lip 306 prevents the seat from being lifted upward. The Villari effect sensor 10 is placed between two supporting posts 308 and 310 that serve to transfer the weight of the seat frame 312 to the sensor. The sleeve assembly 344 does not restrain the downward movement of the seat frame 312 and allows all of the weight from the seat 300 to be borne by the Villari effect sensors 10. The associated weight estimation algorithm 24 calculates the weight of the occupant by adding the measured forces from each of the four individual Villari effect sensors 10 and subtracting the known weight of the seat 300.

As noted above, Terfenol materials exhibit a high Villari effect sensitivity, and are therefore preferable from a technical standpoint as materials for the sensing rod 52 in a compressive force sensor. However, these materials are relatively expensive which is a disadvantage for production applications.

Figure 17:
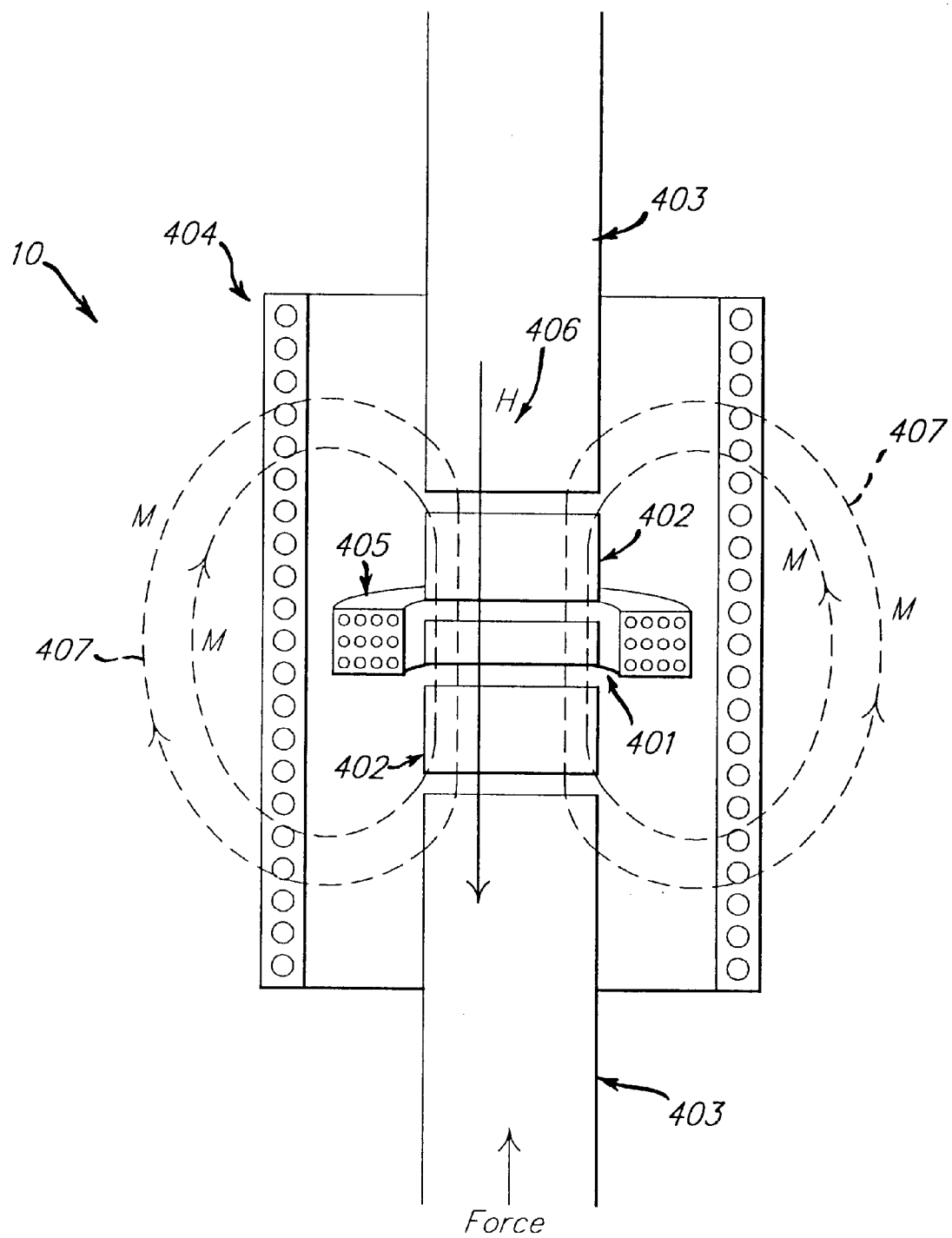
FIG. 17 illustrates a cross-sectional view of another embodiment of the instant invention.

Referring to FIG. 17, a modified Villari effect sensor 10 is illustrated which incorporates a relatively small, puck-shaped piece of Terfenol with a thickness of 4 mm and a diameter of 5 mm that would be economical to produce. The Terfenol sensing element 401 is concentric with a sensing coil 405, both of which are concentric with a drive coil 404. The Terfenol sensing element 401 is also coaxial with a pair of ferrous flux focussing elements 402, the faces of which are adjacent to the faces of the Terfenol sensing element 401. The material of the flux focussing elements 402 preferably has a moderate level of permeability which helps to focus the B-field flux lines 407 to be parallel to the direction of the applied force within the Terfenol sensing element 401. The material preferably has a permeability less than that of the Terfenol sensing element 401 so that the measured level of the B-field within the Terfenol is primarily due to the force level changes rather than to external magnetization.

The distal faces of the flux focussing elements 402 are adjacent to respective ends of a pair of nonferrous rods 403. An alternating current signal applied to the drive coil 404 creates a time varying excitation H-field 406 that is coaxial to the Terfenol sensing element 401, the flux focussing elements 402, the nonferrous rods 403, the sensing coil 405, the Terfenol sensing element 401, and the applied force. The relatively long length of the drive coil 404 ensures that the excitation H-field 406 is parallel to the direction of the applied force within the Terfenol sensing element 401. The flux focussing elements 402 help to focus the resulting B-field flux lines 407 within the Terfenol sensing element 401. The nonferrous rods 403 permits the B-field flux lines 407 to bend away from the axis of the applied force to form a closed path. The sensing coil 405 is much shorter than the drive coil 404 and is designed to measure the magnetization of the Terfenol sensing element 401.

A variety of sensing materials were tested for suitability in a Villari effect sensor 10 as illustrated in Table 2.

TABLE 2

| Material | Magneto-striction | ← Material Composition → | | | |
|---|---|---|---|---|---|
| | | Nickel | Vanadium | Iron | Cobalt |
| Nickel | Negative | >99.6% | | | |
| Iron | Positive | | | 99.5% | |
| Vanadium Pennendur | Positive | | 1.80% | 48.7% | 49.5% |
| 46-Permalloy | Positive | 46.15% | | 53.42% | |
| Seat wire | Negative | | | | |
| Terfenol-D | Positive | | | | |

The seat wires were taken from a Ford Taurus. Their exact composition was unavailable, however the wires most certainly consisted primarily of iron. Their magnetic response was also consistent with a very high iron content. The Terfenol-D material consists of 67% iron, 23% dysprosium, and 10% terbium. This material is an anisotropic material which is formulated so as to have its maximum magnetostrictive response in a direction parallel to the length of the rods. In this report this material is frequently referred to as "Terfenol," but it should be understood that the material which was actually used was Terfenol-D. The addition of the "D" suffix indicates that dysprosium is present in the material. Terfenol was invented first and it was later discovered that the addition of dysprosium significantly increases the magnetostrictive properties of the material.

In order to remove any effects of work hardening incurred in the manufacturing of the rods, samples of nickel, 46-permalloy, and vanadium permendur were heat treated in accordance with Table 3. The heat treatment was necessarily different for each material. A heat treatment cycle was not performed on the iron because initial testing revealed that the material exhibited little Villari effect response and therefore had very limited potential as a sensing material. The iron rods from the Ford Taurus were not heat treated because their testing was intended to determine whether or not the existing seat wires could be used as a sensing medium.

The purpose of heat treatment is to remove all work hardening effects that occur in the machining and manufacturing of the rod samples. Heat treatment removes work hardening effects and increases the permeability of the material. Heat treatment also serves to ensure sample-to-sample uniformity of the materials. Without heat treatment the level of work hardening, and therefore permeability, can vary significantly from sample to sample.

These heat treatment cycles were designed in order to maximize the Villari effect sensitivity of the materials. The materials were cleaned (all oil and carbon-bearing materials removed) prior to annealing. The samples were supported by a suitable means in order to prevent warping during the heat treatment.

TABLE 3

Annealing Procedure: Nickel rods (pure nickel)

| | |
|---|---|
| Annealing Environment: | high vacuum (sulfur free) |
| Annealing Temperature: | 1350° F. ± 25° F. (732° C. ± 14° C.) |
| Time At Temperature: | 4 hours |
| Cooling: | Cool to 1100° F. (593° C.) at a rate not to exceed 150° F. (83° C.) per hour. "Air cool" from 1100° F. |
| Magnetic Field: | None. |

TABLE 3-continued

| | |
|---|---|
| Special Notes: | Avoid affecting the grain structure during cooling. |

Annealing Procedure: 46-Permalloy (46% Ni, bal Fe)

| | |
|---|---|
| Annealing Enviromnent: | high vacuum (sulfur free) |
| Annealing Temperature: | 2150° F. ± 25° F. (1177° C. ± 14° C.) |
| Time At Temperature: | 4 hours |
| Cooling: | Cool to 1125° F. (607° C.) at a rate not to exceed 150° F. (83° C.) per hour. Cool to 600–650° F. at a rate not to exceed 220° F. per hour. "Air cool" thereafter. |
| Magnetic Field: | None. |

Annealing Procedure (Magnetostriction Anneal):
Vanadium Permendur (49.5% Co, 1.8% V, bal Fe)

| | |
|---|---|
| Annealing Enviromnent: | high vacuum |
| Annealing Temperature: | 1022° F. ± 20° F. (550° C. ± 11° C.) |
| Time At Temperature: | 1.5 hours |
| Cooling: | Cool to 600° F. (316° C.) at a rate not greater than 129° F. (72° C.) per hour. From 600° F. furnace cool to room temperature. |
| Magnetic Field: | None. |

An extensive study of candidate discriminants were tested for samples of Terfenol, nickel, seat wires, vanadium permendur, iron, and 46-permalloy. The ideal discriminant should change monotonically with increasing force and should have a characteristic which is nearly linear. The use of maximum flux density is clearly the easiest discriminant to measure and it also provides a discriminant which is better than any of the other hysteresis discriminants which were tested. The results of experiments shows that Terfenol, vanadium permendur, or heat treated 46-permalloy can be used in a Villari effect sensor for measuring compressive force. Permalloy is the better choice because it is far less expensive than Terfenol and because it is more sensitive than vanadium permendur. Results showed excellent performance of nickel when measuring tensile stress. This material clearly works well in a tension-measuring Villari effect sensor. Maximum flux density can be used as the discriminant for either style sensor. Maximum flux density can easily be measured since it is proportional to the peak level of the integrator output signal (V2). The RMS signal level of the integrator output works as well as the peak signal level (maximum flux density). RMS signal level was used as the discriminant for the plot shown in FIG. 10.

The frequency domain discriminant (3rd harmonic minus 1st) provides a more sensitive discriminant. The frequency domain discriminant also has advantages in a noisy environment since the FFT acts as a bank of matched filters. In the presence of broadband noise an N-point FFT provides a signal-to-noise ratio improvement of N. The frequency domain discriminant also offers a larger change in the discriminant for the same pressure level change. With heat-treated nickel, for example, the frequency discriminant provides an 11 dB change over the 0 to 6 Kpsi pressure range. Use of the maximum flux density discriminant over this same 0 to 6 Kpsi pressure range provides only a 2.4 dB (−24.2%) change. The greater sensitivity offered by the frequency discriminant may be advantageous if the additional complexity necessitated by FFT processing can be afforded. The test results showed little response of the frequency domain discriminant with vanadium permendur under compression.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A Villari effect sensor for measuring an applied force, comprising:
   (a). a magnetostrictive sensing rod in series with the load path of the applied force, whereby said sensing rod is linear and continuous and further comprises a plurality of sections, each said section adjacent to one another and having a distinct cross-sectional area;
   (b). a drive coil concentric with said sensing rod for magnetizing said sensing rod responsive to an alternating current applied to said drive coil;
   (c). a plurality of sensing coils concentric with said sensing rod, each said sensing coil inductively coupled to said drive coil about one of said plurality of sections of said sensing rod, whereby each said sensing coil generates a signal responsive to the force-dependent permeability of said sensing rod at each one of said plurality of sections; and
   (d). a signal processor operatively coupled to said plurality of sensing coils for calculating the applied force from said signals generated by each of said plurality of sensing coils.

2. A Villari effect sensor for measuring an applied force as recited in claim 1, wherein said signal processor calculates the applied force using the difference in the magnitudes of the first and third harmonics of at least one of said signals generated by each of said plurality of sensing coils.

3. A Villari effect sensor for measuring an applied force as recited in claim 1, wherein the applied force is tensile and said sensing rod is constructed from nickel.

4. A Villari effect sensor for measuring an applied force as recited in claim 1, wherein the applied force is compressive and said sensing rod is constructed from a material selected from the group consisting of permalloy, 46-permalloy, Terfenol-D, Terfenol, and vanadium permadur.

5. A Villari effect sensor for measuring an applied force as recited in claim 1, wherein the said drive coil overlaps said plurality of sensing coils.

6. A Villari effect sensor for measuring an applied force, comprising:
   (a). a magnetostrictive sensing element mechanically coupled to the applied force, whereby said magnetostrictive sensing element comprises a plurality of sections, each said section having a distinct cross-sectional area;
   (b). a source of magnetization for generating a magnetic field within said magnetostrictive sensing element; and
   (c). a plurality of sensing coils, whereby each said sensing coil generates a signal responsive to the force-dependent permeability of said magnetostrictive sensing element at each one of said plurality of sections.

7. A Villari effect sensor for measuring an applied force as recited in claim 6, wherein said magnetic field is oscillating at a frequency of oscillation.

8. A Villari effect sensor for measuring an applied force as recited in claim 7, further comprising a signal processor operatively coupled to said plurality of sensing coils for calculating a measure of the applied force from at least one of each said signal generated by said at least one sensing coil.

9. A Villari effect sensor for measuring an applied force as recited in claim 8, wherein said signal processor calculates the applied force using the difference in the decibel magnitudes of the first and third harmonics of at least one of said signals generated by each of said plurality of sensing coils.

10. A Villari effect sensor for measuring an applied force as recited in claim 8, wherein said signal processor calculates said measure of the applied force using the difference in the decibel magnitudes of different harmonics of at least one of said signal generated by each of said plurality of sensing coils.

11. A Villari effect sensor for measuring an applied force as recited in claim 8, wherein said signal processor calculates said measure of the applied force using a measure of the maximum flux density of at least one of said plurality of sensing coils.

12. A Villari effect sensor for measuring an applied force as recited in claim 8, further comprising at least one integrator, the input of said at least one integrator operatively coupled to one of said at least one sensing coil, the output of said at least one integrator operatively coupled to said signal processor, whereby said at least one integrator generates a integral signal at said output of said at least one integrator that is the integral of the signal at said input of said at least one integrator and said signal processor calculates said measure of the applied force responsive to said integral signal.

13. A Villari effect sensor for measuring an applied force as recited in claim 6, wherein the applied force is tensile and said sensing rod is constructed from nickel.

14. A Villari effect sensor for measuring an applied force as recited in claim 6, wherein the applied force is compressive and said sensing rod is constructed from a material selected from the group consisting of permalloy, 46-permalloy, Terfenol-D, Terfenol, and vanadium permadur.

15. A Villari effect sensor for measuring an applied force as recited in claim 6, wherein said source of magnetization comprises at least one drive coil for magnetizing said magnetostrictive sensing element responsive to an alternating current applied to said drive coil.

16. A Villari effect sensor for measuring an applied force as recited in claim 15, wherein said at least one drive coil is in overlapping relationship with said at least one sensing coil.

17. A Villari effect sensor for measuring an applied force as recited in claim 15, wherein said at least one drive coil is concentric with said magnetostrictive sensing element.

18. A Villari effect sensor for measuring an applied force as recited in claim 6, wherein said magnetostrictive sensing element is in series with the load path of the applied force.

19. A Villari effect sensor for measuring an applied force as recited in claim 6, wherein said magnetostrictive sensing element is constructed from a material for which the permeability thereof decreases responsive to the applied force.

20. A Villari effect sensor for measuring an applied force as recited in claim 6, wherein said plurality of sensing coils is concentric with said magnetostrictive sensing element.

21. A Villari effect sensor for measuring an applied force, comprising:
   (a). a magnetostrictive sensing element mechanically coupled to the applied force, whereby said magnetostrictive sensing element is constructed from a material for which the permeability thereof decreases responsive to the applied force;
   (b). A drive coil for magnetizing said magnetostrictive sensing element responsive to an alternating current applied to said drive coil;

(c). At least one sensing coil concentric with said magnetostrictive sensing element whereby said at least one sensing coil generates a signal responsive to the force-dependent permeability of said magnetostrictive sensing element proximate to said sensing coil; and (d). a means for focusing magnetic flux adjacent said magnetostrictive sensing element and within said drive coil, whereby the permeabiltiy of said means for focussing element is less than the permeabiltiy of said magnetostrictive sensing element.

22. A system for measuring the weight upon a seating surface within a motor vehicle, comprising:

(a). at least one Villari effect force sensor, each said Villari effect force sensor comprising:
  (i) a magnetostrictive sensing element mechanically coupled to the seating surface such that a force is applied to said magnetostricitve element responsive to the weight upon the seating surface;
  (ii) A source of magnetization for generating a magnetic field within said magnetostrictive sensing element; and
  (iii) At least one sensing coil, whereby each said at least one sensing coil generates a signal responsive to the permeability of said magnetostrictive sensing element proximate to said sensing coil; and (b). a signal processor operatively coupled to said at least one sensing coil, said signal processor calculates a measure of the weight on the seat responsive to said signal, whereby said at least one Villari effect force sensor is incorporated into the seat support structure and senses an applied force that is responsive to the weight upon the seating surface.

23. A system for measuring the weight upon a seating surface within a motor vehicle as recited in claim 22, wherein said applied force is a tensile force within at least one lateral seat cushion support member.

24. A system for measuring the weight upon a seating surface within a motor vehicle as recited in claim 22, wherein said applied force is a tensile force applied to at least one seat spring.

25. A system for measuring the weight upon a seating surface within a motor vehicle as recited in claim 22, wherein said applied force is the force within the support posts of the seat.

26. A method of sensing the weight upon a vehicle seat, comprising:

(a). applying a force to a magnetostrictive sensing element responsive to the weight upon the seating surface;

(b). generating an oscillating magnetic field in said magnetostrictive sensing element, whereby the magnetostrictive sensing element causes variations in said oscillating magnetic field responsive to the weight upon the seating surface; and (c). calculating a measure of the weight upon the seating surface from variations in said oscillating magnetic field.

27. A method of sensing the weight upon a vehicle seat as recited in claim 26, wherein the step of calculating a measure of the weight upon the seating surface is based at least in part upon a harmonic of said variations in said oscillating magnetic field.

28. A method of sensing the weight upon a vehicle seat as recited in claim 27, wherein the step of calculating a measure of the weight upon the seating surface is based at least in part upon the difference in the decibel magnitude of two different harmonics of said variations in said oscillating magnetic field.

29. A method of sensing the weight upon a vehicle seat as recited in claim 28, wherein the step of calculating a measure of the weight upon the seating surface is based at least in part upon the difference in the decibel magnitude of the first and third harmonics of said variations in said oscillating magnetic field.

30. A Villari effect sensor for measuring an applied force, comprising:

(a). a magnetostrictive sensing rod in series with the load path of the applied force, whereby said sensing rod is linear and continuous and further comprises a plurality of sections, each said section adjacent to one another and having a distinct cross-sectional area;

(b). a drive coil concentric with said sensing rod for magnetizing said sensing rod responsive to an alternating current applied to said drive coil;

(c). a plurality of sensing coils concentric with said sensing rod, each said sensing coil inductively coupled to said drive coil about one of said plurality of sections of said sensing rod, whereby each said sensing coil generates a signal responsive to the permeability of said sensing rod; and (d). a signal processor operatively coupled to said plurality of sensing coils for calculating the applied force from said signals generated by each of said plurality of sensing coils, wherein said signal processor calculates the applied force using the difference in the magnitudes of the first and third harmonics of at least one of said signals generated by each of said plurality of sensing coils.

* * * * *